July 29, 1941. J. G. ZOLLEIS 2,250,517

COUPLING CONNECTION

Filed May 8, 1939

INVENTOR
John G. Zolleis
BY
Marshall J Hurley
ATTORNEYS

Patented July 29, 1941

2,250,517

UNITED STATES PATENT OFFICE 2,250,517

COUPLING CONNECTION

John G. Zolleis, Philadelphia, Pa.

Application May 8, 1939, Serial No. 272,387

5 Claims. (Cl. 285—123)

This invention relates to a union or coupling connection adapted for use in connecting two pipes.

The union or coupling may, for instance, be used for adjustably or, if desired, for fixedly connecting a supply pipe nipple and the inlet pipe of a faucet, although it is adapted for general application and it should be understood that it is not intended to limit the coupling to such use.

Faucet unions and valve union connections as manufactured at present are fixed and have definite standard dimensions and no adjustment whatever is provided.

When replacements are necessary for basin or bath tub faucets, considerable trouble is experienced in fitting the faucets since the supply pipes are fixed and cannot be moved, and the faucets as manufactured have different lengths of shanks, causing the plumber no end of trouble to make a satisfactory replacement installation.

Similar difficulties are experienced on new installations since the plumber or steam fitter has to get just the right combination of lengths for his supply pipe or faucet union connection when roughening in,—otherwise they do not fit.

Various unsatisfactory make-shift slip connections with rubber or soft washers have been put on the market to overcome these difficulties, but the problem still remains unsolved.

The invention has for its salient object to provide an adjustable coupling that will overcome the above difficulties and that is simple and practical in construction, can be easily and quickly applied and will be leakproof.

Another object of the invention is to provide a connection of the character described having a metal-to-metal seat and so constructed and arranged that the parts connected will be capable of relative adjustment.

Further objects of the invention will appear from the following specification taken in connection with the drawing which forms a part of this application, and in which Fig. 1 is a view partly in section showing the coupling connection in use for connecting the shank of a water faucet and the nipple of a supply pipe, the parts being shown in the position taken before the connection has been tightened;

Figure 1:
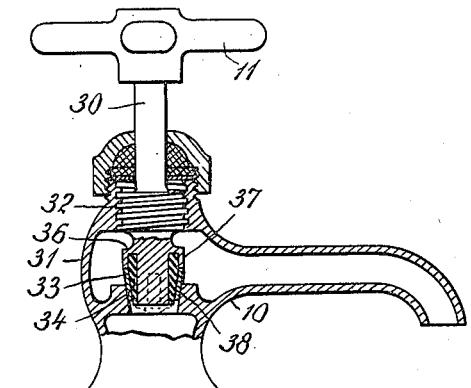
Figure 2:
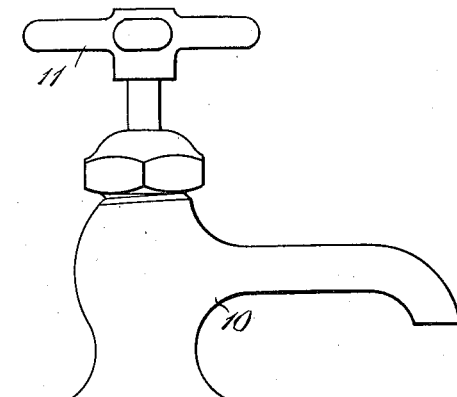
Fig. 2 is a view similar to Fig. 1 but showing the coupling connection tightened and in finished form.

In the embodiment of the invention illustrated in Figs. 1 and 2 there is shown a faucet 10 having the usual handle 11 and having an inlet pipe or shank 12, the shank having a tapered seat 13 at its lower end.

There is shown a nipple 14 adapted for connection to the supply pipe and having an outside diameter smaller than the internal diameter of the shank, whereby the nipple can be moved into the lower end of the shank.

Figure 3:
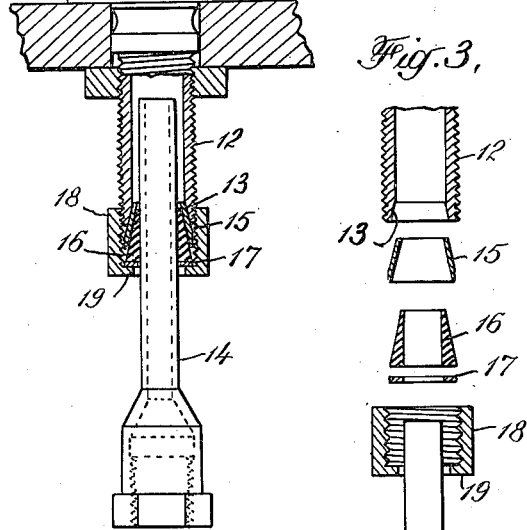
Fig. 3 is an exploded view of the parts shown in Fig. 1.

In the form of coupling shown in Figs. 1–3, a relatively thin conical metal band 15 surrounds the nipple 14 and is adapted to seat against the tapered seat 13 formed on the end of the shank 12. A collar 16 of compressible material, such as rubber, is disposed within the band 15 and engages the outer surface of the nipple 14. A flat washer 17 also surrounds the nipple and engages the outer end of the collar 16 and is forced against the collar 16 by a nut 18 which is threaded onto the shank 12 and has an inwardly extending flange 19 which surrounds the nipple and engages the washer 17.

It will be obvious that as the nut 18 is screwed up the flange 19 will engage the washer 17 and force the compressible collar 16 tightly into the conical band 15, thus forcing the band 15 into firm engagement with the seat 13, forming a metal-to-metal seat. Fig. 2 shows the completed connection.

Figure 5:
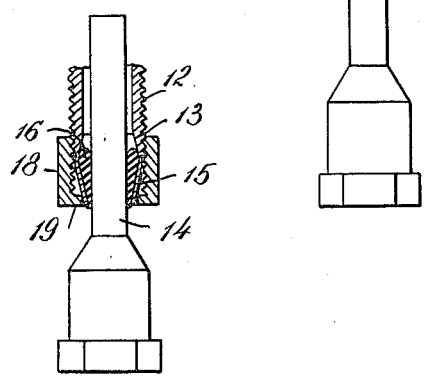
Fig. 5 is a view similar to Fig. 2, but showing the coupling parts reversed end for end.

In the form of the invention illustrated in Fig. 5, the same elements are present as those shown in Figs. 1–3, but in this case they are reversed. The collar 16 has its tapered end extending outwardly and the large end of the collar seats against the seat 13. The conical band 15 is also reversed and is engaged by the flange 19 of the nut 18.

In Fig. 1 the invention is also illustrated as adapted to form the valve seat contact for opening and closing the faucet. The valve stem 30 which is threaded to the housing 31 at 32 has a conical metal band 33 surrounding its inner end and a conical collar 34 of compressible material, such as rubber, is compressed between a flange 36 and the band 33. An annular flange 37 encloses the outer end of collar 34. As the faucet is closed the collar 34 will be forced into band 33 and will tightly lock the band to the valve stem. The band 33 thus forms a metal-to-metal seat with valve seat 38, but the resilient cushion formed by collar 34 insures a tight, vibration-proof and leak-proof seat.

It should be noted that the metal band seat and the compressible collar are cone or taper shaped and when they are fitted to the shank of the faucet, or any other similar connection, and the lock nut is attached to the faucet shank and pulled up tightly, it compresses the tapered compressible collar into the tapered metal band seat, forming an absolutely tight seal about the supply pipe by the tapered compressible collar and at the same time forming a tight seal of the metal cone to the seat in the faucet shank.

Furthermore, the compression of the tapered compressible collar into the tapered metal band forms a permanent and rigid combination seat that grips with tremendous power. The more this combination taper is compressed the more powerfully it will grip.

When the lock nut is disconnected after the joint is made up this leaves the metal tapered seat and tapered compressible washer permanently affixed to the supply pipe.

This taper-to-taper compression is most important as it unquestionably distinguishes from the various slip connections that use followers to compress the packing or rubber. Likewise, stuffing boxes as used on valve stems, which utilize a follower or packing gland to compress the packing.

Instead of using the tapered rubber washer, graphite asbestos packing, metallic packing, lead or any other compressible alloy or material can be utilized.

Another important factor is that when the joint is made up the tapered compressible washer acts as a cushion for the tapered metal cap seat which will mold itself to any irregularities in the seat of the faucet shank or similar connection and requires only a few half-turns on the lock nut to form a tight seal at both the metal-to-metal seat and about the supply pipe.

Figure 4:
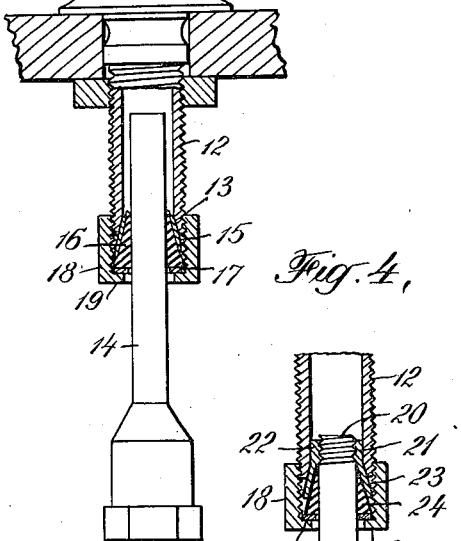
Fig. 4 is a sectional elevation illustrating a modified form of the invention.

Fig. 4 illustrates a construction similar to that shown in Figs. 1-3, but in this case the inner end 20 of the nipple 14 is threaded. The band or sleeve 21 surrounding the nipple has a cylindrical portion 22 adapted to enter the end of the shank 12 and also has a conical portion 23 which receives the compressible conical collar 24. A washer 25 similar to the washer 17 engages the outer end of the collar 24 and is in turn engaged by the flange 19 on the nut 18.

Moreover, when the tapered metal cap seat and the tapered compressible washer are rigidly affixed to the supply pipe, the tapered metal band seat grips substantially the full length of the compressible collar and further acts as a protector to the compressible washer from liquids, gases, etc., that might otherwise attack the compressible washer. If desired, the metal band may be made to entirely cover the outer surface of the compressible collar.

The collar 21 is preferably of hard material, such as steel, and as the nipple is rotated in the collar the collar will act as a die and cut a thread on the nipple. It will be understood that the nipple is initially threaded for a short distance in order to enable the collar 21 which forms the die to be started thereon.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. Means for sealing a joint between two telescoping members, said means comprising a ring of distortable material surrounding the inner member, a continuous conical band surrounding the ring, the inner diameter of the outer member being dimensioned to receive said ring and band, and means engaging the end of the ring for forcing the ring into the band and the band into the end of the outer member to deform the ring into substantially permanent engagement with said inner member and said band into close conformity with the seat at the end of the outer member.

2. Means for sealing a joint between two telescoping members, the outer member having an enlargement of the bore, said means comprising a conical ring of distortable material surrounding the inner member, a continuous flexible band of less length than said ring surrounding the ring, and means impinging on the end of said ring for forcing said ring into said band and said band into said conical bore to deform said ring into substantial permanent engagement with said inner member and said band into close conformity with said conical seat.

3. In combination, a pair of pipes, one pipe being dimensioned to fit within the other, a collar of relatively hard metal having die teeth therein, mounted on and adapted to cut teeth on the inner pipe, said collar having a flared end beyond the die teeth, a second collar of compressible material on the inner pipe, a nut threaded on the end of the outer pipe and having an inwardly extending portion arranged to force the second collar into the first collar and to compress the second collar on the inner pipe.

4. In combination, a pair of pipes, one pipe being arranged to fit within the other, a compressible collar on the inner pipe, a continuous, yieldable, metal band surrounding the collar and having a conical outer surface adapted to seat against the end of the outer pipe, and means carried by the outer pipe for forcing the compressible collar into the metal band to form a tight seal around the inner pipe and a tight seat on the outer end of the outer pipe.

5. In combination, a valve casing having a valve seat therein, a valve stem, a conical, resilient collar on said stem and a conical, yieldable metal, open ended band surrounding said collar and arranged to seat on the valve seat, the collar forming a resilient cushion for the metal band, the resilient collar being forced longitudinally in the band by the closing of the valve and the pressure developed by the closing movement.

JOHN G. ZOLLEIS.